US00RE44786E

(19) United States
(12) Reissued Patent
Hudson et al.

(10) Patent Number: US RE44,786 E
(45) Date of Reissued Patent: Mar. 4, 2014

(54) SYSTEM AND METHOD FOR MONITORING HANDLING OF A FIREARM OR OTHER TRIGGER-BASED DEVICE

(75) Inventors: William B. Hudson, Platteville, WI (US); William J. Lewinski, Mankato, MN (US)

(73) Assignee: Force Science Institute Ltd., Mankato, MN (US)

(21) Appl. No.: 13/435,282

(22) Filed: Mar. 30, 2012

Related U.S. Patent Documents

Reissue of:
(64) Patent No.: 7,688,219
Issued: Mar. 30, 2010
Appl. No.: 11/615,565
Filed: Dec. 22, 2006

U.S. Applications:
(60) Provisional application No. 60/752,798, filed on Dec. 22, 2005.

(51) Int. Cl.
*G08B 21/00* (2006.01)

(52) U.S. Cl.
USPC ..... 340/686.1; 434/11; 434/19; 434/21; 434/22; 434/247; 273/271; 250/222.1

(58) Field of Classification Search
USPC ..... 340/686.1; 434/11, 16, 18–22, 247, 434/307 R, 308, 365; 89/41.03, 7, 199; 73/379.02
See application file for complete search history.

(56) References Cited

U.S. PATENT DOCUMENTS 3,989,384 A 11/1976 Friedman
4,352,665 A 10/1982 Kimble et al.
4,457,715 A 7/1984 Knight et al.
4,657,511 A 4/1987 Allard et al.
5,316,479 A 5/1994 Wong et al.
5,344,320 A 9/1994 Inbar et al.
5,631,437 A 5/1997 LaVigna et al.
6,257,893 B1 * 7/2001 Trabut ..... 434/11
6,260,466 B1 7/2001 Humphreys
6,322,365 B1 11/2001 Shechter et al.
6,890,178 B2 5/2005 Gouko et al.
7,093,370 B2 8/2006 Hansberry et al.
7,688,219 B2 3/2010 Hudson et al.
2002/0009694 A1 1/2002 Rosa
2004/0259644 A1 12/2004 McCauley
2006/0276256 A1 12/2006 Storek
2009/0209346 A1 8/2009 Cheng et al.
2011/0207089 A1 8/2011 Lagettie et al.

OTHER PUBLICATIONS

Next Level Training, Inc., SIRT Training Pistol, Brochure, 5 pages, www.nextlevelshooting.com, believed to have been publicly available before Sep. 19, 2011.

* cited by examiner

*Primary Examiner* — Tai T Nguyen
*Assistant Examiner* — Ojiako Nwugo
(74) *Attorney, Agent, or Firm* — Craige Thompson; Thompson Patent Law Offices

(57) ABSTRACT

Hand position monitoring systems and methods for use with firearms. The hand monitoring system monitors a hand position of a firearm user and includes a sensor assembly and a controller. The sensor assembly acquires hand position information (e.g., index or trigger finger position information) of a firearm user and electronically communicates the hand position information for review and/or analysis.

32 Claims, 5 Drawing Sheets

SYSTEM AND METHOD FOR MONITORING HANDLING OF A FIREARM OR OTHER TRIGGER-BASED DEVICE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority under 35 U.S.C. §119(e)(1) to U.S. Provisional Patent Application Ser. No. 60/752,798, filed Dec. 22, 2005, entitled "Firearm Hand Position Monitoring System and Method," and bearing, the entire teachings of which are incorporated herein by reference.

BACKGROUND OF THE INVENTION

The present disclosure relates to systems and methods for monitoring user operation or handling of a trigger-based device, such as a firearm. In particular, it relates to monitoring a hand position of a user (e.g., a trigger finger of the user) handling a trigger-based device, for example a user handling a firearm.

Proper handling and use of a firearm requires many hours of training, especially for persons required to carry and possibly use a firearm on a regular basis. For example, training a firearm user to position his or her hand properly can facilitate safe and effective use of firearms. As a point of reference, as used throughout this specification, the word "hand" is inclusive of all portions of a human hand, for example the palm, fingers, thumb, etc. With this in mind, one type of firearm training includes ensuring that a user keeps his or her finger off of the firearm trigger up until a point where a decision to discharge the firearm has been made. Typically, situations giving rise to discharge decisions are highly stressful and exciting. Unfortunately, firearm users often regress and forget training during such highly stressful and exciting events. Furthermore, when firearm handling by a particular user is evaluated, it is often difficult for trainers, firearm users, or others to evaluate and recognize whether the firearm user is utilizing proper techniques. For certain users, such as police officers, an ability to evaluate hand position following an actual, in-the-field firing event would be highly beneficial, and may be critical for effective, proper training.

In light of the above, a need exists for systems and methods adapted to monitor and provide meaningful feedback information for a user handling a firearm, or any other trigger-based device.

SUMMARY OF THE INVENTION

Some aspects of the present disclosure relate to a hand position monitoring system for use with a firearm. The system includes a sensor assembly connected to a firearm. The sensor assembly, in turn, includes a sensor for acquiring hand position information of a firearm user and an interface in electronic communication with the sensor. The interface is adapted to receive and electronically communicate the hand position information. In some embodiments, the hand position information is indicative of a position of the user's trigger finger relative to the firearm being handled.

Other aspects of the present disclosure relate to a method of monitoring a hand position of a firearm user. The method includes the user grasping a firearm with the user's hand. Hand position information indicative of a user's hand position relative to the firearm is acquired with one or more sensors connected to the firearm. In some embodiments, the hand position information is index finger position information. Regardless, the hand position information is used to determine whether the user's hand position corresponds to a desired hand position. The determination can, in some embodiments, be communicated to the user, and/or a separate controller, etc.

The present invention is further applicable for monitoring and/or training individuals in the correct use of any system that has a trigger or critical contact point. Thus, while the following description makes specific reference to a handgun-related application, a wide variety of other implements, such as a crossbow, power drill, etc., are also within the scope of the present invention.

DETAILED DESCRIPTION OF THE INVENTION

Figure 1:
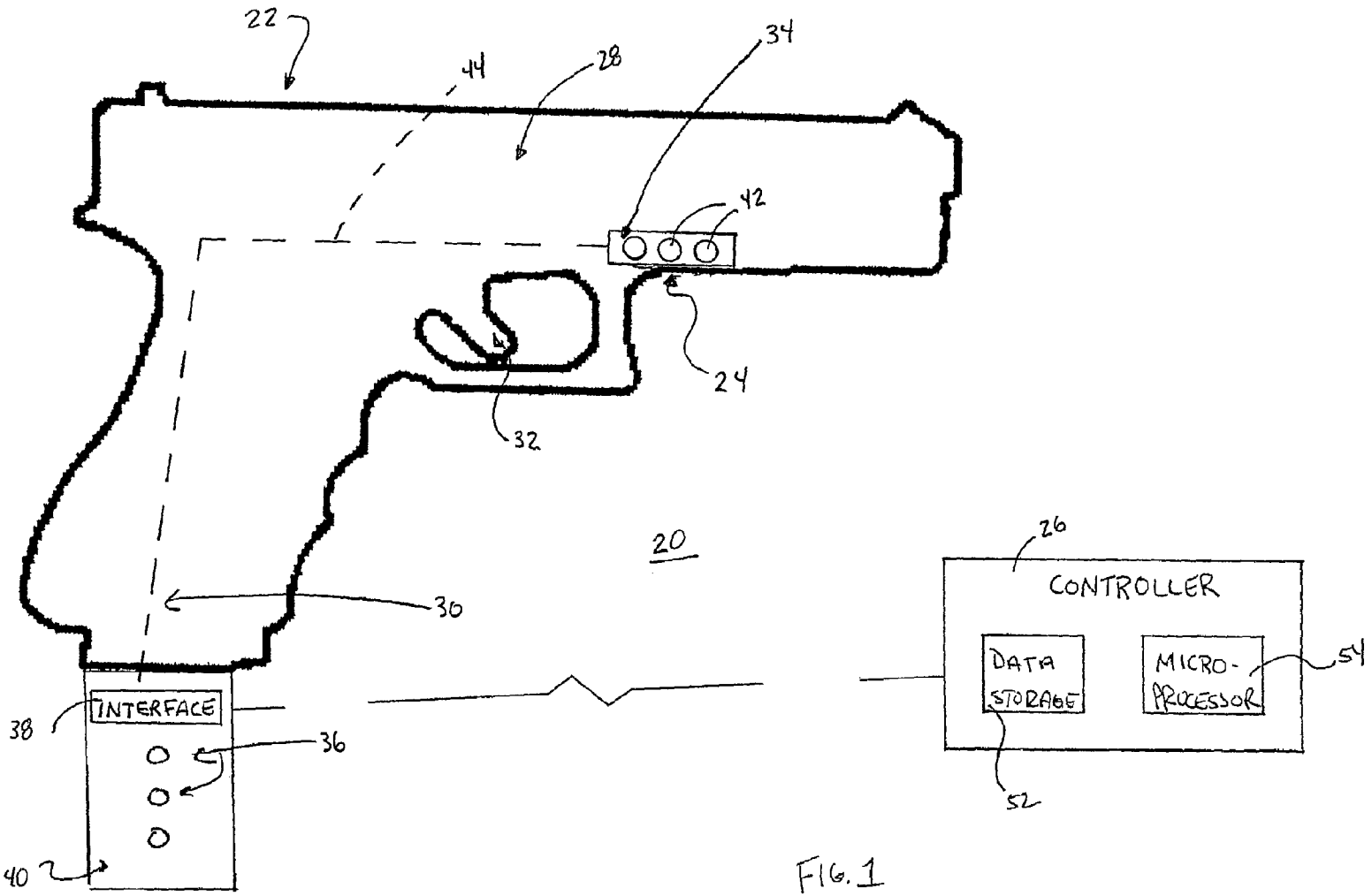
FIG. 1 is a simplified schematic illustration of an embodiment hand position monitoring system in accordance with aspects of the present invention with portions shown in block form, along with a firearm.

One embodiment of a hand position monitoring system 20 for use with a firearm 22 in accordance with aspects of the present disclosure is shown schematically in FIG. 1. The system 20 includes a sensor assembly 24 (referenced generally) attached to the firearm 22, and a controller 26 in direct or indirect communication with the sensor assembly 24 via electronic (e.g., wired or wireless), hydraulic, mechanical, etc., connection.

The firearm 22 can be one of many recognized types of firearms. The firearm 22 can be a handgun, for example. The firearm 22 includes features recognized by those of skill in the art, including a frame 28, a handle or grip 30, and a trigger 32. Generally, discharging the firearm 22 includes a firearm user (not shown) grasping the handle 30 with his/her hand (not shown) and squeezing the trigger 32 with a finger (not shown), such as an index finger, with the finger(s) being considered part of the user's hand. As a point of reference, the system 20 can be employed with other trigger-based devices other than the firearm 22 (e.g., power drill, crossbow, etc.).

The sensor assembly 24 includes, in some embodiments, a sensor device 34, an indicator 36, an interface 38, and a housing 40. The sensor assembly 24 also includes a power source (not shown) for powering the sensor device 34, indicator 36, and/or interface 38. In one embodiment, the power source is a battery.

The sensor device 34 can assume a wide variety of forms, and includes one or more sensors 42 that may or may not be identical. For example, with the one embodiment of FIG. 1, the sensor device 34 includes an array of the sensors 42 akin to a push button/membrane type sensor as known in the art by which a user can tactilely perceive that his/her hand (e.g., finger) is in contact with and depressing one of more of the sensors 42. Thus, the sensor device 34 can include the sensor (s) 42 in the form of a variable force pressure sensor. Alternatively, one or more other sensor types can be equally acceptable including, for example, e-field sensors, motion sensors, proximity sensors, pressure switches, visual recorders and others. Regardless, the sensor device 34 is configured to provide sensor data including hand position information (e.g., index or "trigger" finger position information), for example force or pressure exerted by the user's hand (e.g., index finger) on a portion of the firearm 22.

In some embodiments, the sensor(s) 42 is physically attached to, or formed on an exterior of, the firearm 22. Thus, the sensor(s) 42 can be components formed separately from, and subsequently attached to, an existing firearm; alternatively, the system 20 can include the firearm 22 being specially manufactured for training/monitoring procedures, with the sensor(s) 42 being integrally formed into the firearm 22. Regardless, and by way of but one example, with the embodiment of FIG. 1, the sensor(s) 42 is attached to the frame 28 of the firearm 22 such that by extending his/her index finger (not shown) along the frame 28 of the firearm 22, the firearm user touches, engages, or otherwise causes the sensor(s) 42, and thus the sensor device 34, to signal a change in sensor status indicative of user interaction (e.g., sensor may provide differing signals depending upon whether the user's finger is in contact therewith; may provide an "on" or "off" signal depending upon user contact (or lack thereof); etc). With a configuration in which the sensor device 34 includes the membrane array of one or more sensors 42, the sensor(s) 42 can be located/formed adjacent the trigger 32 and thus at a recommended or accepted trigger/index finger location for user a user otherwise handling the firearm 22 prior to actuation of the trigger 32. As a point of reference, the location of the sensor(s) 42 relative to the firearm 22 of FIG. 1 is, in some embodiments, intended for applications in which a right-handed user handles the firearm 22. That is to say, with the orientation of FIG. 1, when the firearm 22 is conventionally grasped by the right hand of a user, the user's third, fourth and fifth fingers will naturally wrap around the handle/grip 30 and thus into the page of the view of FIG. 1. Further, the user's right hand index finger will naturally reside against the one or more sensors 42, except in discharge situations whereby the right hand index finger will properly be placed against or around the trigger 32. For left handed users, then, the one or more sensors 42 can be located on an opposite side (hidden in FIG. 1) of the firearm frame 28. Regardless, in some embodiments where the sensor device 34 further includes wire(s) 44 (shown with dashed lines in FIG. 1) electronically connecting the sensor(s) 42 to the interface 38 (as described below), the wire(s) 44 can be exteriorly located along the frame 28, extending along a side of the frame 28 opposite that of the sensor(s) 42. With this arrangement, interference with normal user grasping of the handle 30 by the wire(s) 44 is minimized. Alternatively, the wire(s) 44, if provided, can be located anywhere along the frame 28.

The indicator 36 is configured to provide an alert or other human perceptible notification to the firearm user and/or a third-party of a current firearm handling status (e.g., whether or not the user's index finger is in contact with a certain region of the firearm frame 28). The indicator 36 can be a visual alert, for example one or more LED-type lights, although other indicator types can be equally acceptable including, for example, tactile alerts, such as vibrators or static discharge; audible alerts, such as alarms; and others. The indicator 36 is attached to the housing 40, although other locations can be equally acceptable, for example the handle 30 of the firearm 22. Even further, in other embodiments, the indicator 36 can be eliminated and thus is an optional component of the present disclosure.

Figure 2:
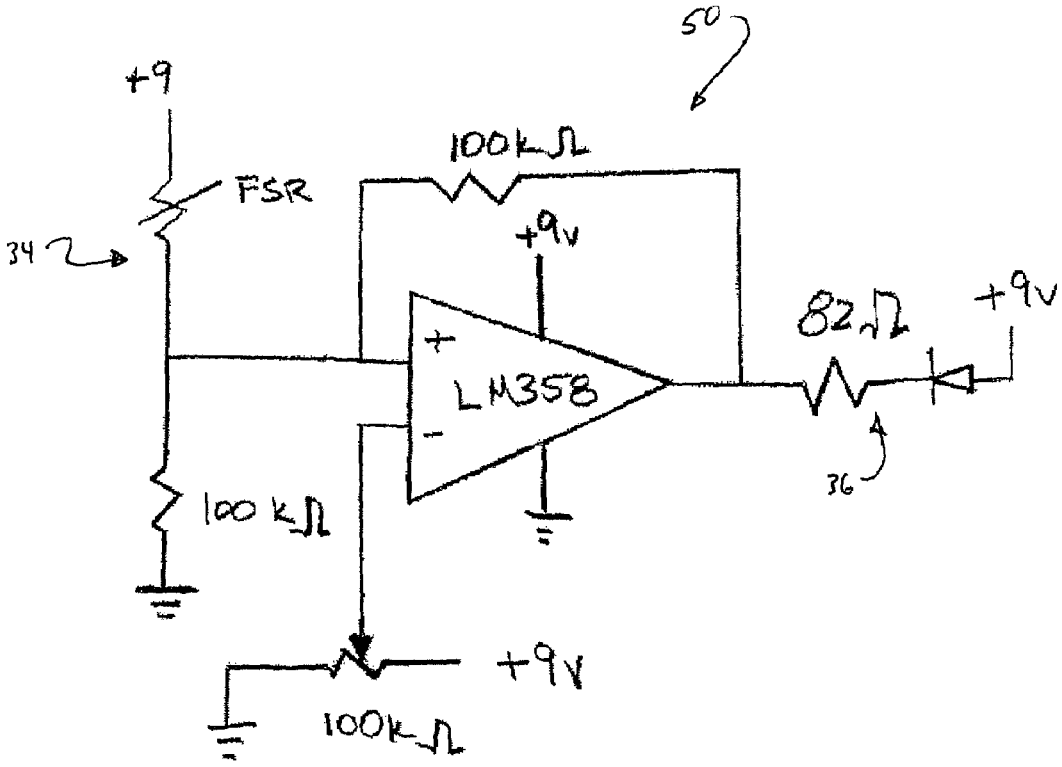
FIG. 2 is a schematic illustration of circuitry useful with the system of FIG. 1.

The interface 38 is in electronic communication with the sensor device 34, the indicator 36 (where provided), and the controller 26. The interface 38 is maintained within the housing 40, which, in turn is attached to the handle 30 of the firearm 22 (e.g., mechanical fastener, adhesive, etc.). Alternatively, the housing 40 can be integrally formed with the firearm handle 30/frame 28. Regardless, and in general terms, the interface 36 includes circuitry 50 (FIG. 2) and/or a microprocessor (not shown), and is adapted to acquire data from the sensor device 34 (either continuously or periodically) and communicate the sensor data to the controller 26. The interface 38 can be connected to the sensor device 34 with wiring (e.g., the wire(s) 44), although other connections can be equally acceptable, for example wireless connectors. Along these lines, the interface 38 includes a wireless connector (not shown) for communicating with the controller 26 as is know in the art (e.g., a transceiver). As described below, the interface 38 can be adapted or programmed to continuously transmit acquired sensor data to the controller 26, or periodically transmit the acquired sensor data, and/or transmit the sensor data in response to a polling/request from the controller 26. In other embodiments, the interface 38 can include a memory component (e.g., a memory chip or removable storage card) that stores the acquired sensor data for subsequent downloading to the controller 26 (e.g., via a direct, wired or wireless link).

In some embodiments, the interface 38 is further adapted or programmed to prompt operation of the indicator 36, causing the indicator 36 to generate a perceptible notification indicative of a user's hand position relative to the sensor(s) 42, and thus relative to the firearm frame 28. With this in mind, a schematic of exemplary circuitry 50 is provided in FIG. 2, along with possible schematic representations of the sensor device 34 and the indicator 36. With additional reference to FIG. 1, in general terms, the interface 38 acquires the sensor data from the sensor device 34, and at a certain, pre-determined threshold (or other threshold depending upon the type of sensor employed), causes the indicator 36 to actuate on or off. However, the interface 38 can also cause the indicator 36 to be activated proportionately to levels "sensed" by or at the sensor device 34; for example, where the indicator 36 is an LED and the sensor device 34 includes a force/pressure sensor 42, the indicator 36 can be actuated to produce lower or higher light intensities as force/pressure increases or decreases. A wide variety of other notification protocols can be implemented by or with the interface 38, such that the present disclosure is in no way limited to the circuitry 50 of FIG. 2.

With specific reference to FIG. 1, the controller 26 includes a wireless connector (not shown), for example a transceiver, for receiving the sensor data from the interface 38, although other connector formats are also acceptable. The controller 26 also includes a data storage device 52 and a microprocessor 54. The data storage device 52 is configured to store the sensor data for subsequent and/or contemporary use, while the microprocessor 54 is configured to translate, analyze, evaluate, display, and/or communicate the sensor data to the firearm user and/or third parties as described below. The data storage device 52 and the microprocessor 54 can assume a variety of forms, and are of types known in the art.

In some embodiments, the system 20 provides information indicative of whether the firearm user is handling the firearm 22 in a desired, predetermined manner, including using and maintaining a first hand position at desired times, such as when the user is encountering circumstances deemed to not be a firearm discharge situation and/or when the firearm user has not yet made a decision to discharge the firearm 22. The first hand position includes placing the index (or trigger) finger of the firearm user on the frame 28 of the firearm 22 adjacent, but not on, the trigger 32. Thus, for a right-handed user, the first hand position entails the user's right hand trigger finger positioned and maintained along the frame 28 in the region of the sensor(s) 42.

A method of monitoring the hand position (including, or in some embodiments limited to, the user's index or trigger finger position) of the firearm user can be described in association with use of the system 20. Initially, it can be assumed that the firearm user will grasp the firearm 22 by the handle 30, employing the first hand position described above. The sensor device 34, and in particular the sensor(s) 42, is positioned along the frame 28 of the firearm 22 (and relative to the trigger 32) at a location being generally accepted as a proper, non-firing, trigger finger position. As a result, when the firearm user assumes the first hand position, or the proper non-firing position, the index finger of the firearm user exerts some force against the sensor(s) 42. In turn, the sensor device 34 provides hand position information, for example an amount of force the index finger is exerting on the sensor(s) 42, to the interface 38. The interface 38 acquires the sensor data from the sensor device 34 and prompts operation of the indicator 36 (where provided) to notify or otherwise indicate to the firearm user and/or third parties that the firearm user is using the first hand position. For example, where the indicator 36 is an LED, the indicator 36 is illuminated in response to a prompt from the interface 38.

The firearm user can then experience or otherwise be placed in a "discharge scenario" (hypothetical or actual), where the firearm user must make decisions relating to whether or not to discharge the firearm 22. The discharge scenario can include proper discharge events and/or improper discharge events. A proper discharge event is an event that accepted practice dictates should cause the firearm user to decide to discharge the firearm 22. An improper discharge event is an event that accepted practice dictates should not cause the firearm user to discharge the firearm 22.

Along these lines, the method includes presenting the firearm user with, or monitoring the firearm user under circumstances later deemed to be, an improper discharge event (hypothetical or actual), and determining whether the user ceases to use the first hand position. The method also includes presenting the firearm user with, or monitoring the firearm user under circumstances later deemed to be, a proper discharge event (hypothetical or actual), and determining whether the user ceases to use the first hand position.

In particular, ceasing to use the first hand position is characterized by the firearm user removing his or her index finger from the frame 28 of the firearm 22. In turn, the sensor device 34 provides corresponding hand position information to the interface 38, including, for example, an amount of force (or lack thereof) exerted on the sensor(s) 42. As the index finger is removed from the sensor(s) 42, the sensed force decreases or becomes zero. The interface 38 acquires the sensor data from the sensor device 34 and prompts operation of the indicator 36 (where provided) to notify the firearm user and/or third parties that the firearm user is no longer using the first hand position. For example, where the indicator 36 is an LED, the interface 38 prompts the indicator 36 to reduce or cease illumination.

Alternatively or in addition to activating the indicator 36, the interface 38 sends the sensor data to the controller 26. In turn, the data storage device 52 stores the sensor data. The microprocessor 54 of the controller 26 performs various analytical and/or display functions. For example, the microprocessor 54 can utilize evaluation software to provide the firearm user and/or third parties with data related to the hand position information acquired during the discharge scenario.

A response of the firearm user during the discharge scenario can be reviewed and evaluated with the system 20. The discharge scenario can occur as a part of a controlled environment, e.g., a simulation, or an uncontrolled environment, e.g., an in-the-field environment. For example, when used in a simulation, the discharge scenario or a portion thereof can be viewed, reviewed, videotaped, and/or recorded with the system 20. As another example, when used in-the-field, the response of the firearm user during the discharge scenario can viewed, reviewed, videotaped, and/or recorded with the system 20 as evidence that the firearm user, e.g., a police officer, a hunter, a hobbyist, etc., acted properly or improperly during the discharge event or events (before, during, and/or after discharge).

In addition, or as an alternative to the above, one or more components of the system 20 can operate to serve as a trigger safety for the firearm 22. In particular, the sensor device 34 can be linked (e.g., via the interface 38) to a mechanical lock or safety mechanism associated with the trigger 32 that otherwise serves to selectively allow or prevent actuation of the trigger 32 (and thus discharge of the firearm 22 by a user). With this configuration, then, the system 20 can be configured such that when the sensor device 34 "senses" the presence of the user's index finger on the corresponding portion of the frame 28, the safety mechanism is automatically engaged to prevent movement/actuation of the trigger 32 (and thus accidental discharge of the firearm 28). Conversely, when the sensor device 34 signals information indicative of the user's index finger being withdrawn from the frame 28, the system 20 operates to disengage the safety mechanism (and/or allows a user to manually disengage the safety mechanism).

Figure 3:
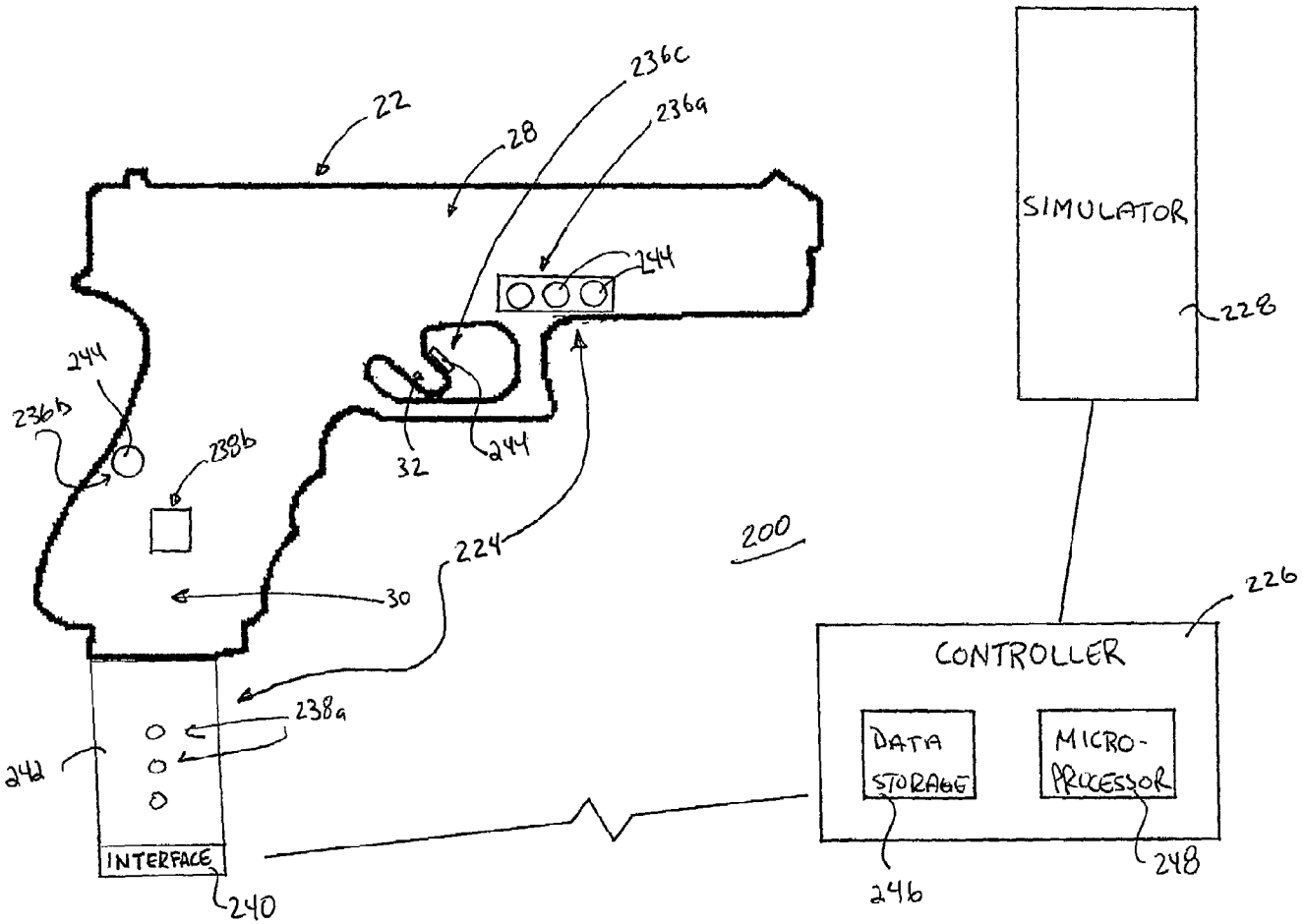
FIG. 3 is a simplified schematic illustration of another embodiment hand position monitoring system in accordance with the present invention with portions shown in block form, along with a firearm.

Another hand position monitoring system 200 for use with the firearm 22 is shown in FIG. 3. The system 200 includes a sensor assembly 224 (referenced generally), a controller 226, and a simulator 228. The firearm 22 again includes the frame 28, the handle 30 connected to the frame 28, and the trigger 32 connected to the frame 28. Conventional operation of the firearm 22 is described above.

The sensor assembly 224 includes a plurality of sensors devices 236, one or more indicators 238, an interface 240, and a housing 242. The sensor assembly 224 can also include a power source, for example a battery, to power the plurality of sensors devices 236, the indicator(s) 238, and/or the interface 240. In one embodiment, each of the plurality of sensors 236 is attached to various parts of the firearm 22. For example, as shown, at least one of the plurality of sensor devices 236a includes one or more sensors 244 disposed on (and exteriorly accessible at) the frame 28; the sensor device 236b includes one or more sensors 244 disposed on the handle 30; and the sensor device 236c includes a one or more sensors 244 disposed on the trigger 32, respectively. Each of the plurality of sensors 244 can be a sensor array or a single sensor, and can assume a variety of forms such as a variable force pressure sensor, although other types such as those previously described are also contemplated. Each of the plurality of sensor devices 236 is configured to provide sensor data indicative of hand position information. As a point of reference, the sensors 244 can each be electronically connected to the interface 240 via wiring (not shown), wirelessly connected, etc.

The indicator(s) 238 is configured to notify or alert the user and/or third parties of hand position-related information. For example, the indicator 238a can be or include an LED, while the indicator 238b (drawn in block form) can be a vibratory motor (e.g., akin to a vibration motor used in cell phones). However, as described above in association with the indicator 36, other types of indicators can be equally acceptable. In but one acceptable embodiment, the indicator 238a is affixed to the interface 240, while the indicator 238b is affixed to the handle 30 of the firearm 22; alternatively, a wide variety of other locations are also acceptable, and one or more of the indicators 238 can be eliminated (or additional indicator(s) 238 added).

The interface 240 is in electronic communication with the plurality of sensor devices 236, the plurality of indicators 238, and the controller 226. The interface 240 is disposed in the housing 242, which is connected to the frame 28 of the firearm 22 in some embodiments. The interface 240 can operate under substantially similar principles to the interface 38 (FIG. 1) described above. Generally, the interface 240 acquires sensor data from the plurality of sensor devices 236 and is adapted to prompt operation of the indicator(s) 238. The interface 240 is also adapted to communicate and/or translate the sensor data to the controller 226. The interface 240 is connected to the plurality of sensor devices 236 and the indicator(s) 238 with wiring (not shown), although other connections can be equally acceptable. The interface 240 also includes a wireless connector (not shown) for communicating with the controller 226.

The controller 226, in turn, includes a first wireless connector (not shown), such as a transceiver, for receiving the sensor data from the interface 240 and/or sending control commands or prompts to the interface 240, although other connectors can be equally acceptable. In this regard, the controller 226 also includes a data storage device 246 and a microprocessor 248 as are known in the art.

The simulator 228 is represented in block form in FIG. 3, and is generally configured to present a firearm user with hypothetical discharge scenarios, including proper and/or improper discharge events as described above. The simulator 228 is in electronic communication with the controller 226 and can send simulation data to the controller 226 and receive simulation control commands/data from the controller 226. For example, the simulator 228 can send information related to whether a proper or an improper simulation discharge event has been presented (or is currently being presented) to the firearm user. Additionally, the simulator 228 can receive information from the controller 226 to modify the discharge event presented by the simulator 228 to the firearm user and/or can include a user input device (not shown), such as a keyboard or touch screen, via which a user can enter simulation-related information or commands. In other embodiments, the simulator 228 need not be directly linked to the controller 226. With these parameters in mind, the simulator 228 can include a number of components appropriate for presenting discharge/training scenarios to the firearm user, such as a display screen, speaker(s), pre-programmed hardware or software containing various, predetermined scenarios, etc.

In light of the above, it can be understood that the system 200 provides information as to whether the firearm user is using the first hand position under simulation circumstances deemed improper to discharge the firearm 22 and/or when the firearm user has not yet made a decision to discharge the firearm 22. The system 200 also provides information as to whether the firearm user is using a second hand position under simulation circumstances deemed proper to discharge the firearm 22 and/or when the firearm user has made a decision to discharge the firearm. The second hand position can include placing the index finger on the trigger 32 of the firearm 22.

In particular, the system 200 senses movement of the hand with greater resolution by including the plurality of sensor devices 236, as opposed to a single sensor device, for example. The additional information can be used in a variety of manners; for example, when the firearm 22 is first grasped by the handle 30, the interface 242 can send sensor data to the controller 226. The controller 226 can, in turn, send simulator control data to the simulator 228 to initiate a presentation of a discharge scenario to the firearm user; initiate storing sensor data in the data storage device 246; send control data to the interface 242 to activate one of the plurality of indicators 238; and others. Regardless, the system 200 acquires sensor data from the plurality of sensor devices 236 to determine and electronically communicate to the user and/or third parties the movement of at least a relevant portion of the hand (e.g., the index or trigger finger) of the firearm user.

One embodiment method of monitoring the hand position of the firearm user can be described in association with use of the system 200. In particular, the method includes presenting the firearm user with a discharge event with the simulator 228, acquiring sensor data related to the relative position of the hand of the user, and conveying to the user and/or third parties the relative position of the hand.

The simulator 228 operates to present the firearm user with a hypothetical discharge scenario previously deemed to indicate that firearm discharge is necessary or proper (e.g., a proper discharge event) or deemed to indicate that firearm discharge is not necessary (e.g., an improper discharge event). The simulator 228 can send event data to the controller 226 indicating whether the current simulator scenario is indicative of a proper or improper discharge event. Assuming the firearm user follows accepted firearm handling techniques or protocols, the user initially grasps the firearm 22 with the first hand position, and subsequently in response to the discharge event (as presented by the simulator 228) changes his or her hand position to grasp the firearm 22 with the second hand position. Conversely, when the discharge scenario is an improper discharge event, the user's hand position should not, in theory, deviate from the first hand position.

The interface 240 acquires and sends sensor data to the controller 226 throughout the above firearm user simulation. For example, sensor data related to how/with what force the user is grasping the handle 30, the force applied to the trigger 32, how far the index finger moves, and/or how fast the index finger moves during the discharge event.

The event data from the simulator 228 and the sensor data from the interface 240 are collected by the controller 226 and stored in the data storage device 246. The microprocessor 248 can then operate (either automatically or in response to a user request) to analyze, evaluate, and/or display the collected data based upon appropriate programming provided to or with the microprocessor 248 (e.g., software). Such analysis, evaluation, and/or display of the collected data can be presented to the user and/or third parties (e.g., in electronic and/or paper form). In particular, the combined event data and sensor data can be used to facilitate an analysis of how the firearm user reacted to various discharge events presented during the hypothetical simulator-created discharge scenario(s). Furthermore, the controller 226 can optionally operate, in some embodiments, to prompt operation of the interface 240 in a predetermined fashion upon recognizing (e.g., via pre-programmed parameters) that the firearm user has reacted improperly to a discharge event. For example, the controller 226 can cause the interface 240 to actuate one or more of the plurality of indicators 238, for example the indicator 238b to vibrate, notifying or alerting the firearm user that he or she has responded in a manner deviating from expected firearm handling protocol(s).

In light of the above, a response of the firearm user during the discharge scenario can be reviewed and/or evaluated. When used with the simulator 228, the discharge scenario occurs as a part of a controlled environment. However, the simulator 228 can be omitted such that the system 200 is used in an uncontrolled environment, e.g., in-the-field. When used in a simulation, the discharge scenario or a portion thereof can be viewed, videotaped, and/or recorded with the system 200. This applies equally to in-the-field applications. When used in-the-field, the response of the firearm user during the discharge scenario can also be viewed, reviewed, videotaped, and/or recorded with the system 200 as evidence that the firearm user, e.g., a police officer, a hunter, a hobbyist, etc., acted properly or improperly during the discharge scenario.

Figure 4:
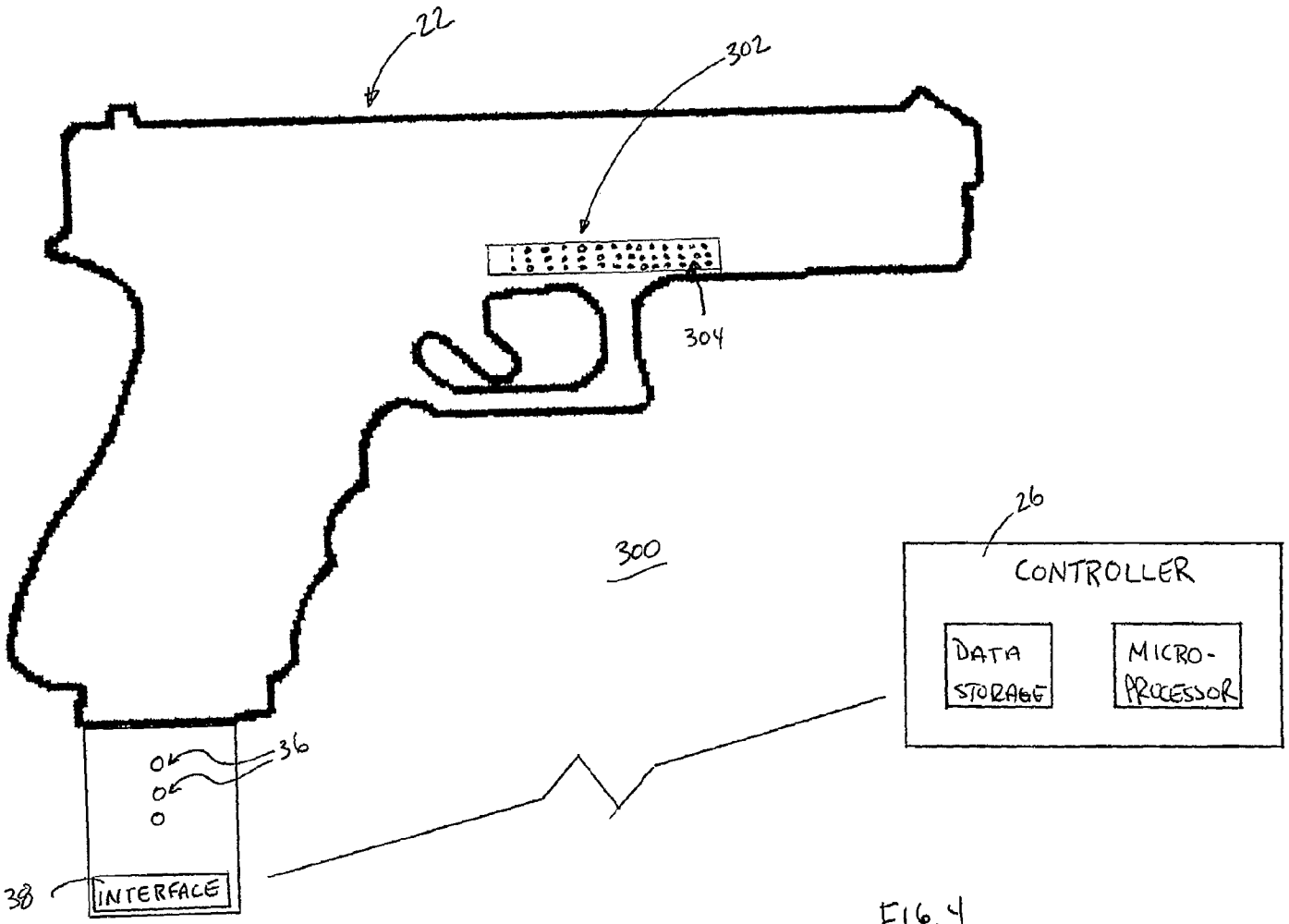
FIG. 4 is a simplified schematic illustration of another embodiment hand position monitor in accordance with aspects of the present invention with portions shown in block form, along with a firearm.

While the systems 20, 200 described above have described the corresponding sensor device(s) as including a membrane/pressure-type sensor, other sensor configurations are also envisioned. For example, FIG. 4 schematically illustrates an alternative embodiment firearm handling monitoring system 300 in connection with the firearm 22. The system 300 is similar to previous embodiments, and includes the controller 26, the indicator 36, and the interface 38 as previously described. In addition, the system 300 includes one or more sensor devices 302 that each includes a sensor 304 electronically connected to the interface 38, for example by wiring (not shown), wireless, etc. With the embodiment of FIG. 4, the sensor 304 is an electronic field (or e-field) sensor. In general terms, the e-field sensor 304 generates a low level electric field and then detects changes in that field caused, for example, by a position or change in position of a user's hand (or relevant portion thereof) relative to the e-field sensor. E-field sensors are known, and are available, for example, from Freescale Semiconductor, Inc. under the trade designation of MC34940. Essentially, then, the e-field sensor 304 provides a relatively large array of small sensors that facilitate "tracking" of a user's finger relative to the region of the firearm frame 28 to which the e-field sensor 304 is applied. Regardless, the e-field sensor 304 can electronically communicate with the interface 38 via wired or wireless connection.

In use, the system 300 operates in a manner akin to the above descriptions. Though not shown, the system 300 can further include the simulator 228 (FIG. 3) as previously described. In general terms, the sensor device 302 provides information to the interface 38 indicative of a position of the user's index or trigger finger relative to the firearm frame 28 (or other hand position information). The interface 38, in turn, transmits the sensor data to the controller 26 for concurrent and/or subsequent analysis. In this regard, the sensor data can be compared with one or more discharge events (hypothetical or actual) in evaluating whether the firearm user is/was handling the firearm 22 in a desired fashion (e.g., time stamps associated with the sensor data can be correlated with timing of various aspects of one or more discharge events (proper or improper) in evaluating the user's handling of the firearm 22). Further, and as previously described, the interface 38 can prompt operation of the indicator(s) 36 (where provided) in response to the sensor data.

Figure 5:
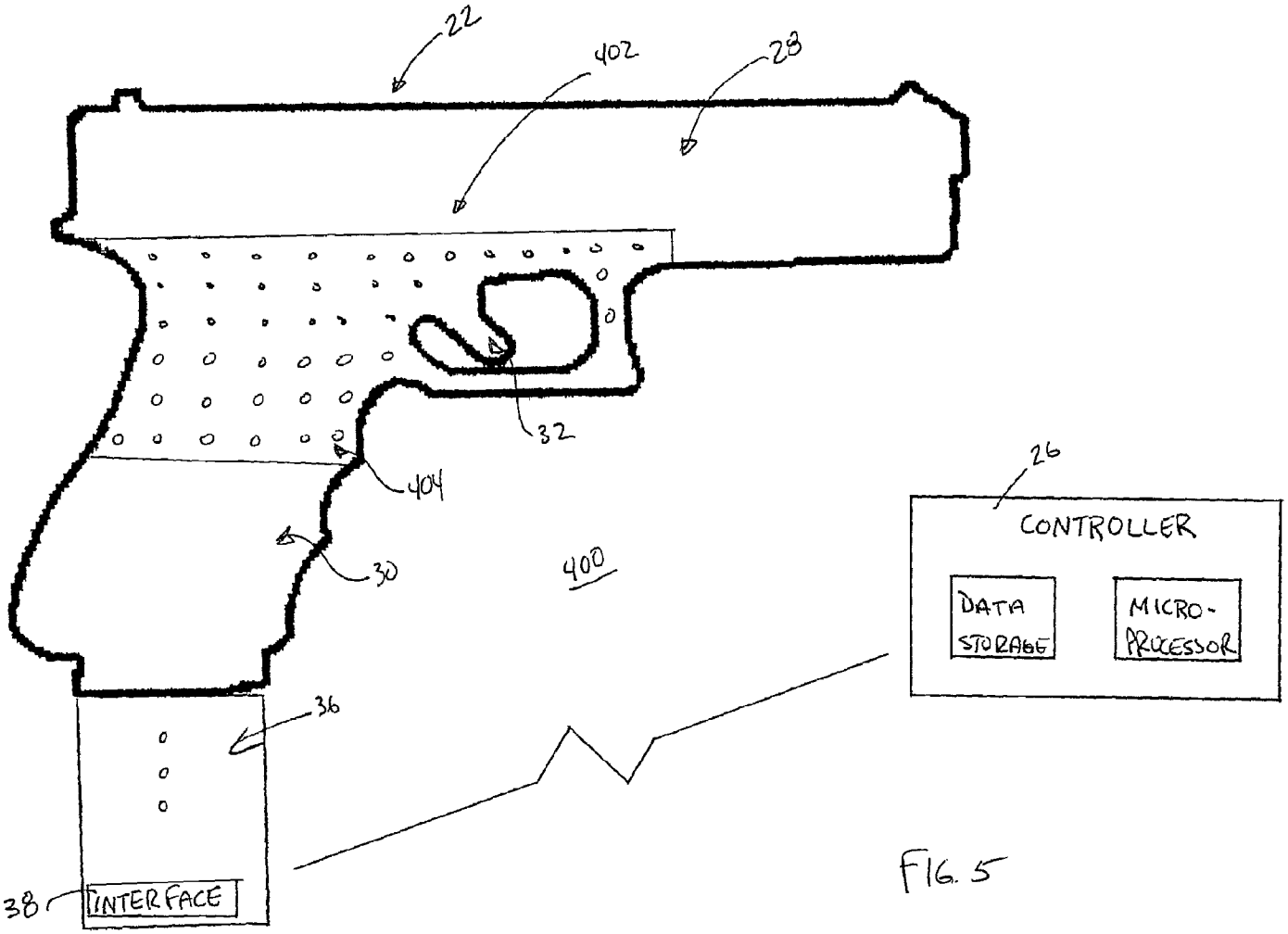
FIG. 5 is a simplified schematic illustration of another embodiment hand position monitor system in accordance with aspects of the present invention with portions shown in block form, along with a firearm.

Yet another embodiment monitoring system 400 is schematically provided in FIG. 5 in connection with the firearm 22. The system 400 is similar to previous embodiments, and includes the controller 26, the optional indicator 36, and the interface 38. In addition, the system 400 includes a sensor device 402 including at least one sensor 404 electronically connected to the interface 38 (wired or wireless). As compared to previous embodiments, the sensor 404 encompasses a larger portion of the firearm frame 28, and thus can provide an even greater amount of hand position-related information. For example, the sensor 404 (or a plurality of sensors) can be disposed not only adjacent the trigger 32, but also along a majority, and in some embodiments an entirety, of the grip/handle 30. With this approach, then, the system 400 can operate to provide hand position information indicative of index/trigger finger position as well as user hand position along the grip 30 during various discharge events.

While the various monitoring systems described above have included one or more sensors physically disposed or formed on or along the firearm frame 28, in yet other embodiments, one or more sensors can be provided that are not directly mounted to the firearm 22. For example, one or more of the systems above can include a sensor device in the form of remote imaging equipment loaded with programmed with appropriate pattern recognition software. As is known in the art, the remote imaging equipment includes one or more cameras that can remotely "track" the user's hand position relative to the firearm 22 via the pattern recognition software, with this resultant sensor information being correlated to a discharge event (hypothetical or actual) in evaluating user's handling of the firearm 22. In fact, in some embodiments, the monitoring system of the present disclosure does not include any sensors directly mounted to or formed by the firearm frame 28.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof. For example, the systems and methods disclosed herein are equally useful with other trigger-based devices in addition to firearms (e.g., power drills, crossbows, etc.). With these implementations, the device in question is operated by actuating a trigger such that a "trigger event" can be defined (with the "trigger event" being the "discharge" event" referenced above).

What is claimed is:

1. A hand position monitoring system for use with a firearm including a grip, a frame, and a trigger, the system comprising:

a sensor assembly connected to a firearm, the sensor assembly including: a sensor for acquiring hand position information of a firearm user grasping the grip with a hand of the firearm user, the information including:

an index trigger finger of the firearm user's hand in contact with the frame apart from the grip and the trigger;

an interface in electronic communication with the sensor, the interface for receiving and electronically communicating the hand position information; and an indicator in electronic communication with the interface, wherein the interface is adapted to prompt operation of the indicator based upon the hand position information.

2. The system of claim 1, wherein the sensor comprises a pressure sensor.

3. The system of claim 1, wherein the indicator includes an LED.

4. The system of claim 1, further comprising:

a controller in electronic communication with the interface of the sensor assembly, the controller including:

a data storage device for storing the hand position information, and a processor for evaluating the hand position information.

5. The system of claim 1, wherein the sensor assembly further includes a second sensor disposed on the trigger for acquiring hand position information of the firearm user.

6. A method of monitoring a hand position of a firearm user comprising:

prompting the user to grasp a firearm with a hand of the user, the firearm including a grip, a handle, and a trigger;

acquiring, via a sensor connected to the firearm, hand position information during a non-firing time period in which the trigger is not actuated, the acquired hand position information indicative of a user's first hand position relative to the firearm;

automatically determining whether the user's first hand position during the non-firing time period corresponds to a first desired hand position based upon the acquired hand position information, wherein the first desired hand position includes the index trigger finger of the user's hand in contact with the frame and not in contact with the trigger or the grip; and communicating the determination of whether the user's first hand position corresponds to the first desired hand position.

7. The method of claim 6, wherein communicating the determination includes actuating an LED.

8. The method of claim 6, wherein the acquired hand position information is indicative of a presence or absence of the index trigger finger of the user's hand in contact with the frame of the firearm.

9. The method of claim 8, wherein the sensor is located on the frame, immediately adjacent the trigger to establish that the index finger is correctly positioned relative to the firearm whenever the firearm is being grasped by the user but not being fired.

10. The method of claim 9, wherein communicating the determination includes automatically prompting operation of an indicator associated with the firearm in response to a determination that the index trigger finger of the user's hand is not in contact with the sensor.

11. The method of claim 6, further comprising:

subjecting the user to a discharge scenario including an improper discharge event in which the firearm should not be fired;

monitoring the acquired hand position information during the discharge scenario; and evaluating whether the acquired hand position information is indicative of the user acting correctly during the discharge scenario.

12. The method of claim 11, wherein the discharge scenario is an actual situation experienced by the user.

13. The method of claim 11, wherein the discharge scenario is a hypothetical situation presented to the user.

14. The method of claim 6, further comprising:

identify a change in a manner in which the user grasps the firearm to a second user's hand position; and automatically determining whether the second user's hand position corresponds with the first desired hand position based upon the acquired hand position information.

15. The method of claim 14, further comprising:

automatically determining whether the determined second user's hand position corresponds with a second desired hand position, the second desired hand position including the index trigger finger of the user's hand being in contact with the trigger of the firearm.

16. The method of claim 15, further comprising:

subjecting the user to a simulated discharge scenario including a proper discharge event; and determining whether a timing of a change from the first user's hand position to the second user's hand position corresponds with a timing of the proper discharge event.

17. The method of claim 6, further comprising:

placing a firearm user in a discharge scenario including a discharge event;

receiving simulation information related to whether the discharge event is a proper or an improper discharge event; and automatically evaluating the acquired hand position information and the simulation information to determine whether the first user's hand position corresponds to the first desired hand position.

18. A method of monitoring a user handling a trigger-based device, the operation of which includes actuating a trigger with an index trigger finger of the user as part of a triggering event, the method comprising:

associating at least one sensor with a frame portion of the device immediately adjacent, but not on the trigger at which the index trigger finger of the user is expected to reside when handling the device during periods other than a triggering event;

acquiring hand position information from the sensor indicative of a hand position of the user relative to the device including indicating the index trigger finger of user's hand in contact with the frame and not in contact with the trigger; and evaluating a manner in which the user handles the device based upon the acquired hand position information and communicating the results of said evaluation.

19. The system of claim 1, further comprising a simulator including:

a display screen;

a speaker; and a computing device programmed with predetermined firearm discharge training scenarios including:

a first scenario in which the user's index trigger finger should remain on the frame, a second scenario in which the user's index trigger finger should lift from the frame and be placed in contact with the trigger.

*20. A system comprising:*

*a trigger-based device comprising a frame and a trigger operable by a trigger finger of a user;*

*means for sensing the trigger finger proximate to a predetermined region of the frame where the trigger finger is expected to be positioned when the user handles the device during periods other than during a triggering event;*

*means for acquiring hand position information from the sensing means, said hand position information compris-*

*ing information indicative of a position of the trigger finger relative to the predetermined region; and*

*means for indicating information about a manner in which the user handles the trigger-based device in response to the acquired hand position information.*

*21. The system of claim 20, wherein the trigger-based device comprises a firearm.*

*22. The system of claim 20, wherein the trigger-based device comprises a tool operable by a trigger.*

*23. The system of claim 22, wherein the trigger-based device comprises a power drill.*

*24. The system of claim 20, wherein the trigger-based device comprises a crossbow.*

*25. The system of claim 20, wherein the indicating means operates during at least one time interval other than a trigger event.*

*26. The system of claim 20, wherein the sensing means comprises a proximity sensor.*

*27. The system of claim 20, wherein the sensing means comprises a sensor responsive to force or pressure exerted by the user on a portion of the frame.*

*28. The system of claim 20, wherein the sensing means comprises a sensor responsive to motion of the trigger finger being proximate to the predetermined region without actuating the trigger.*

*29. The system of claim 20, wherein the sensing means comprises means for remotely imaging and tracking the hand position of the user relative to the trigger based device.*

*30. The system of claim 20, further comprising a simulator including:*

*means for presenting a simulation scenario to the user; and*

*a computing device programmed with predetermined trigger actuation training scenarios and coupled to the presenting means for presenting the simulation training scenario, the simulation training scenario comprising:*

*a first scenario in which the user's trigger finger should remain proximate to the predetermined region but not in contact with the trigger, and*

*a second scenario in which the user's trigger finger should be placed in contact with the trigger.*

*31. The system of claim 20, wherein the indicating means further indicates information about the manner in which the user handles the device in association with temporal information relative to a trigger event.*

*32. The system of claim 20, further comprising means for locking the trigger against inadvertent actuation in response to the sensing means detecting the trigger finger proximate to the predetermined region of the frame.*

* * * * *